United States Patent
Yokose et al.

(10) Patent No.: US 11,875,024 B2
(45) Date of Patent: Jan. 16, 2024

(54) USER OPERATION RECORDING DEVICE AND USER OPERATION RECORDING METHOD

(71) Applicant: Nippon Telegraph and Telephone Corporation, Tokyo (JP)

(72) Inventors: Fumihiro Yokose, Musashino (JP); Kimio Tsuchikawa, Musashino (JP); Haruo Oishi, Musashino (JP); Yuki Urabe, Musashino (JP); Sayaka Yagi, Musashino (JP); Takeshi Masuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/923,978

(22) PCT Filed: May 15, 2020

(86) PCT No.: PCT/JP2020/019504
§ 371 (c)(1),
(2) Date: Nov. 8, 2022

(87) PCT Pub. No.: WO2021/229809
PCT Pub. Date: Nov. 18, 2021

(65) Prior Publication Data
US 2023/0185435 A1 Jun. 15, 2023

(51) Int. Cl.
*G06F 3/048* (2013.01)
*G06F 3/0484* (2022.01)
*G06F 9/451* (2018.01)

(52) U.S. Cl.
CPC ............ *G06F 3/0484* (2013.01); *G06F 9/452* (2018.02)

(58) Field of Classification Search
CPC .............................. G06F 3/0484; G06F 9/452
See application file for complete search history.

(56) References Cited

U.S. PATENT DOCUMENTS

| | | | |
|---|---|---|---|
| 2004/0130568 A1* | 7/2004 | Nagano | H04N 21/4312 348/E7.083 |
| 2013/0120439 A1* | 5/2013 | Harris | G11B 27/34 345/619 |
| 2014/0123045 A1* | 5/2014 | Wilhelm Martens | G06F 9/543 715/770 |
| 2016/0266769 A1* | 9/2016 | Oursbourn | G06F 9/451 |
| 2018/0284981 A1* | 10/2018 | Lu | G06F 3/04883 |
| 2019/0121608 A1* | 4/2019 | Dolph | G06F 8/38 |

(Continued)

OTHER PUBLICATIONS

Yokose et al., "Business visualization technology that contributes to the promotion of DX," NTT Technical Journal, 2020, retrieved from URL <https://journal.ntt.co.jp/wp-content/uploads/2020/05/JN20200272.pdf>, 32(2):72-25, 9 pages (with English Translation).

*Primary Examiner* — David E Choi
(74) *Attorney, Agent, or Firm* — Fish & Richardson P.C.

(57) ABSTRACT

An acquisition unit acquires image data by performing screen capture of a screen operated by a user, at a predetermined interval. A detection unit detects the user operation. An estimation unit estimates an amount of delay time from a user operation time point to a time point at which the user operation is detected by the detection unit. The selection unit selects image data of the user operation time point out of the acquired image data.

7 Claims, 11 Drawing Sheets

(56) References Cited

U.S. PATENT DOCUMENTS

2019/0392785 A1* 12/2019 Dang ..................... G09G 5/34
2020/0125704 A1*  4/2020 Chavez ................ G06F 21/32
2021/0012155 A1*  1/2021 Vu ..................... G06F 18/2132

* cited by examiner

TABLE OF AMOUNT OF DELAY TIME

| USER OPERATION DETECTION APPROACH | AMOUNT OF DELAY TIME |
|---|---|
| "MouseKeyboardHook" | 50ms |
| "GUIMsgHook" | 150ms |
| "WebBrowserAttach" | 500ms |

Fig. 5

CORRECTION TABLE

| APPLICATION NAME | AMOUNT OF CORRECTION DELAY TIME |
|---|---|
| "RemoteDesktop.exe" | −250ms |
|  |  |
|  |  |

Fig. 6

TABLE OF AMOUNT OF DELAY TIME

| USER OPERATION DETECTION APPROACH | AMOUNT OF DELAY TIME_BEFORE | AMOUNT OF DELAY TIME_AFTER |
|---|---|---|
| "MouseKeyboardHook" | 25ms | 75ms |
| "GUIMsgHook" | 100ms | 200ms |
| "WebBrowserAttach" | 300ms | 700ms |

USER OPERATION RECORDING DEVICE AND USER OPERATION RECORDING METHOD

CROSS-REFERENCE TO RELATED APPLICATIONS

This application is a National Stage application under 35 U.S.C. § 371 of International Application No. PCT/JP2020/019504, having an International Filing Date of May 15, 2020, the disclosure of which is considered part of the disclosure of this application, and is incorporated by reference in its entirety into this application.

TECHNICAL FIELD

The present invention relates to a user operation recording apparatus and a user operation recording method.

BACKGROUND ART

Software that records user operation on a PC for the purpose of business operation analysis and the like has been known (see Non-Patent Literature 1). In such software, a screen capture at the time of operation is recorded together in addition to the time, the username, the application name, and the like, and is utilized for the analysis of the operation situation and the like.

CITATION LIST

Non-Patent Literature

Non-Patent Literature 1: "Operation-visualization Technology to Support Digital Transformation", [online], 2020, NTT Technical Review, 2020 vol. 32 No. 2 [searched on 2020, April 14], the Internet <URL:http://www.ntt.co.jp/journal/2002/JN20200272_h.html>

SUMMARY OF THE INVENTION

Technical Problem

However, in the related-art technology, the screen capture is performed at the timing at which user operation is detected. Therefore, there may be a delay from the time of the operation to the screen capture and it may be difficult to appropriately acquire the screen capture at the time of operation.

The present invention has been made in view of the above, and an object thereof is to appropriately acquire a screen capture at the time of user operation.

Means for Solving the Problem

In order to solve the abovementioned problem and achieve the object, a user operation recording apparatus according to the present invention includes: an acquisition unit that acquires image data by performing screen capture of a screen operated by a user, at a predetermined interval; a detection unit that detects the user operation; an estimation unit that estimates an amount of delay time from a user operation time point to a time point at which the user operation is detected by the detection unit; and a selection unit that selects image data of the user operation time point calculated from the estimated amount of delay time out of the acquired image data.

Effects of the Invention

According to the present invention, the screen capture at the time of user operation is appropriately acquirable.

DESCRIPTION OF EMBODIMENTS

One embodiment of the present invention is described in detail below with reference to the drawings. The present invention is not limited by the embodiment. In the description of the drawings, the same reference characters are applied to the same parts.

[Outline of User Operation Recording Apparatus]

Figure 1:
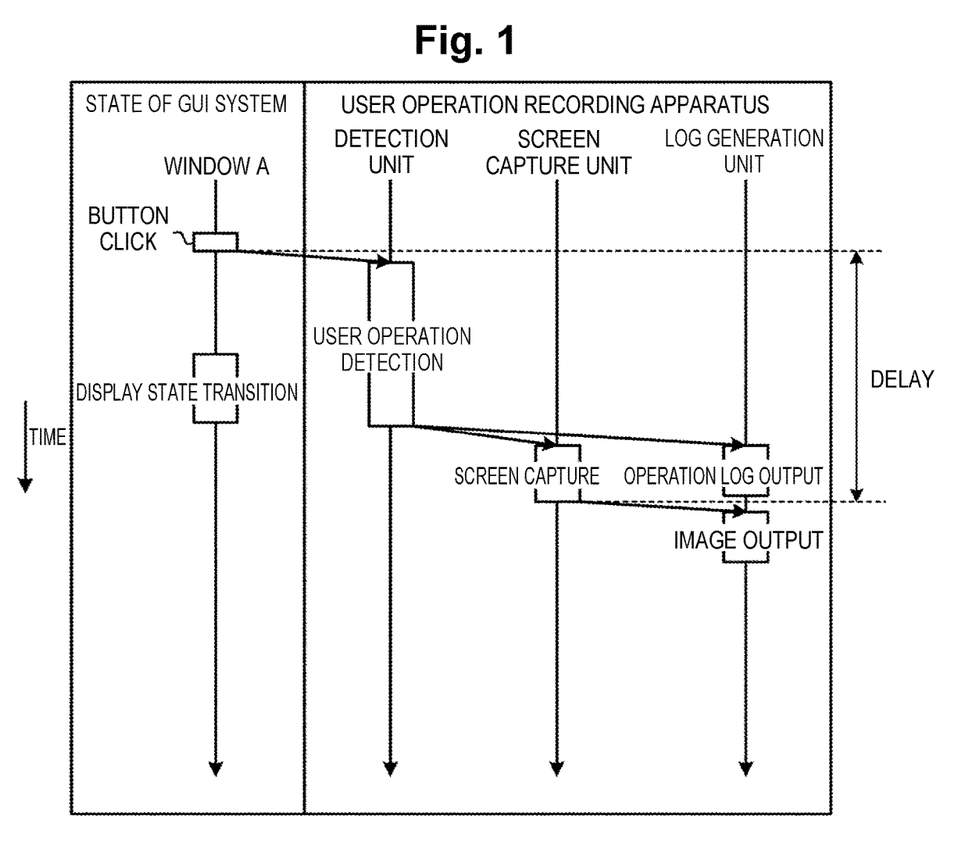
FIG. 1 is a diagram for describing a user operation recording apparatus of an embodiment of the present invention.
Figure 2:
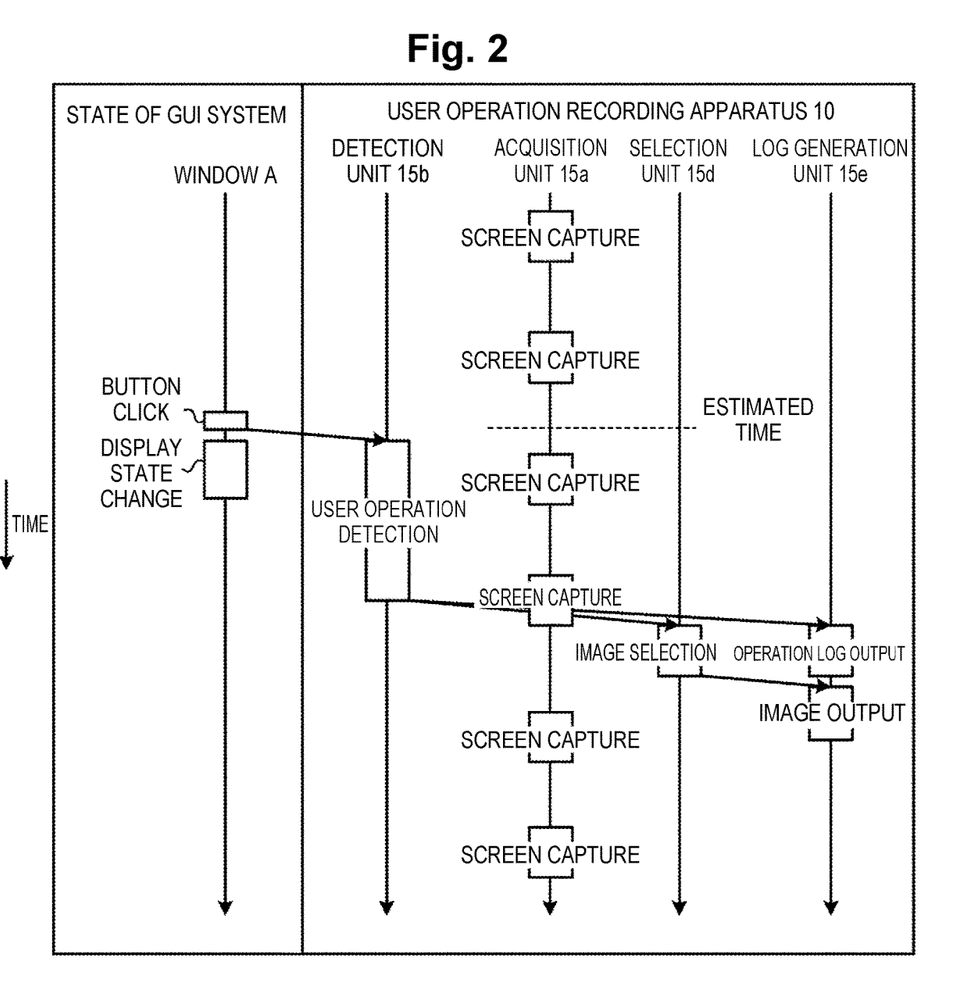
FIG. 2 is a diagram for describing the user operation recording apparatus of the present embodiment.

FIG. 1 and FIG. 2 are diagrams for describing the outline of a user operation recording apparatus of the present embodiment. Hitherto, as illustrated in FIG. 1, screen capture at the time of user operation has been performed at a timing at which the user operation is detected, and hence there has been a delay from the operation time. In the example illustrated in FIG. 1, at a timing at which a detection unit detects that a user has clicked a button of a window A, an operation log is output, a screen capture unit captures the screen, and an image is output. The image in this case is an image at a time point delayed from the time of the user operation.

Meanwhile, as illustrated in FIG. 2, in the user operation recording apparatus of the present embodiment, by user operation recording processing described below, an acquisition unit acquires images by performing screen capture at predetermined intervals regardless of whether the user operation is detected. In the user operation recording apparatus of the present embodiment, when a detection unit detects the user operation, the estimated time of an operation time point is calculated by estimating the amount of delay time of the detection time point from the operation time point, and an image of the estimated time is selected as the image of the operation time point.

[Configuration of User Operation Recording Apparatus]

Figure 3:
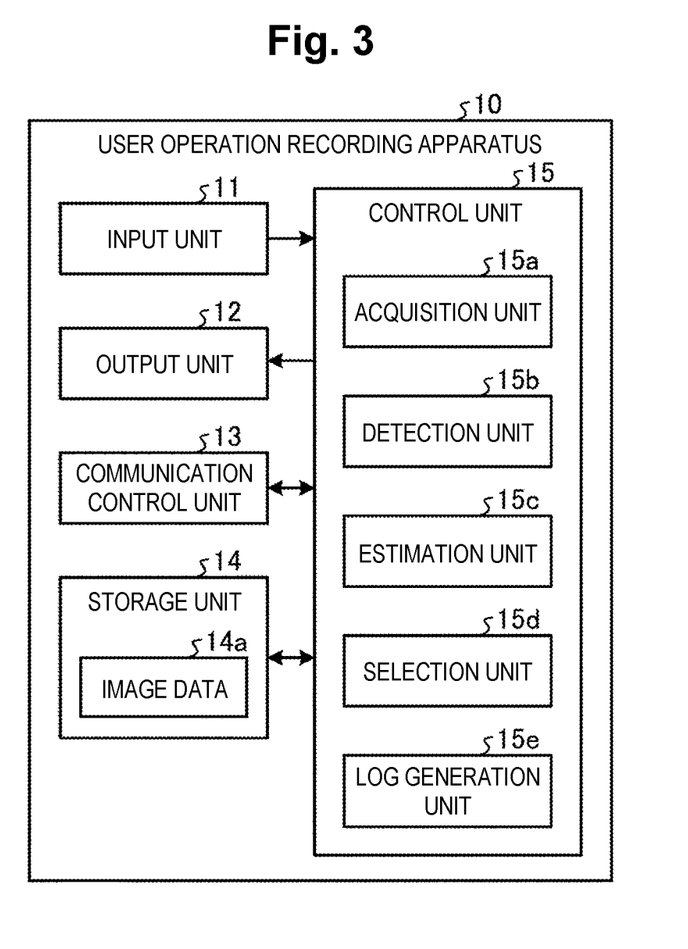
FIG. 3 is a schematic diagram exemplifying a schematic configuration of the user operation recording apparatus of the present embodiment.

FIG. 3 is a schematic diagram exemplifying a schematic configuration of the user operation recording apparatus of the present embodiment. As exemplified in FIG. 3, the user operation recording apparatus 10 of the present embodiment is realized by a general-purpose computer such as a personal computer, and includes an input unit 11, an output unit 12, a communication control unit 13, a storage unit 14, and a control unit 15.

The input unit 11 is realized with use of input devices such as a keyboard and a mouse, and inputs various instruction information such as the processing start to the control unit 15 in correspondence to the input operation by an operator. The output unit 12 is realized by a display apparatus such as a liquid crystal display, a printing apparatus such as a printer, and the like. For example, the output unit 12 is a screen which is a target of the user operation recording processing described below and in which the user operation is reflected. Alternatively, in the output unit 12, the result of the user operation recording processing described below is displayed.

The communication control unit 13 is realized by a network interface card (NIC) and the like and controls communication between external apparatuses and the control unit 15 over an electric telecommunication line such as a local area network (LAN) and the Internet. For example, the communication control unit 13 controls the communication between a management apparatus and the like that manage various information relating to a method of detecting a user operation, processing of an application, and the like and the control unit 15. The screen in which the user operation is reflected may be mounted on hardware different from the user operation recording apparatus 10. In this case, the user operation recording apparatus 10 communicates with a terminal operated by the user via the communication control unit 13.

The storage unit 14 is realized by a semiconductor memory element such as a random access memory (RAM) and a flash memory or a storage apparatus such as a hard disk and an optical disk. In the storage unit 14, a processing program that causes the user operation recording apparatus 10 to operate, data used during the execution of the processing program, and the like are stored in advance or are temporarily stored each time of the processing. The storage unit 14 may communicate with the control unit 15 via the communication control unit 13.

In the present embodiment, the storage unit 14 stores therein image data 14a acquired by the screen capture and information used in processing described below such as the amount of delay time for each method of detecting the user operation and the amount of delay time for each application in the user operation recording processing described below.

The control unit 15 is realized with use of a central processing unit (CPU) and the like and executes a processing program stored in a memory. As a result, as exemplified in FIG. 3, the control unit 15 functions as an acquisition unit 15a, a detection unit 15b, an estimation unit 15c, a selection unit 15d, and a log generation unit 15e. Each or some of those functional units may be mounted on different hardware. The control unit 15 may include other functional units.

The acquisition unit 15a acquires the image data 14a by performing screen capture of the screen operated by the user at a predetermined interval. Specifically, the acquisition unit 15a acquires, at a predetermined interval, pixel information of the entire screen operated by the user that is displayed on the output unit 12 with use of an OS function and the like.

The predetermined interval is a value set in advance in accordance with requirements such as the processing performance of a computer that causes the program to operate and the degree of the accuracy of the image data desired to be acquired, and is from 0.1 seconds to 1.0 seconds, for example. The time at which each image data 14a is acquired can be determined by the time at which the screen capture is started and the predetermined interval, for example.

The acquisition unit 15a causes the storage unit 14 to store the acquired image data 14a therein. At this time, the acquisition unit 15a may cause the storage unit 14 to store therein the acquired image data 14a in association with a user ID for identifying the user, the application name that is the target of operation, and the like. The acquisition unit 15a may associate the acquired time with the acquired image data 14a. For example, when the acquisition unit 15a cannot acquire the image data 14a at a certain interval in an accurate manner, the acquisition unit 15a causes the image data 14a to be stored in association with the acquired time.

The acquisition unit 15a may acquire the image data 14a in units of windows when a GUI system having a structure of a window is the target. For example, the acquisition unit 15a acquires rectangular coordinates of the corresponding window and acquires pixel information in the rectangular coordinates out of the entire screen. In many cases, it is useful when the image data 14a is acquired in units of windows because this makes it possible to reduce the image data volume and show the part to be noticed in an easily recognized manner.

In this case, the acquisition unit 15a stores a window ID for identifying the window in the storage unit 14 in association with the image data 14a. The detection unit 15b described below provides a notification of a window ID relating to the user operation.

When the volume of the image data 14a stored in the storage unit 14 exceeds a predetermined threshold value, the image data 14a is erased in the order from old image data. The threshold value is a value larger than a maximum value of the delay time to the detection taken by the detection unit 15b described below when the detection unit 15b detects the user operation, for example. Alternatively, the threshold value may be defined by the number of the image data 14a.

The detection unit 15b detects the user operation. Specifically, the detection unit 15b detects the operation of the user with use of various detection methods. The detection unit 15b gives IDs for individually identifying user operations that are detected among processing units, for example.

For example, the detection unit 15b detects the operation of the mouse or the keyboard with use of the OS function. In this detection method, there is generally extremely less delay, but the impact on the OS and the application cannot be specifically determined.

Alternatively, the detection unit 15b detects the user operation by monitoring GUI messages that are communication between a GUI system having the structure of a window and the application. For example, the detection unit 15b detects the appearance, the disappearance, the bringing to the foreground (activation), the size change, and the like of the window. The detection unit 15b detects that a button, a text box, and the like for standard GUI control have been clicked in the GUI system.

The detection unit 15b detects the user operation with use of an API uniquely included in the application. For example, the detection unit 15b can detect, for a Web browser generally including an API capable of detecting the user operation, the button click and the like that occur in a Web page displayed on the Web browser. There is generally more delay in this detection method.

The detection unit 15b detects the user operation by monitoring the content of communication between the application and a server and the like over a network.

Figure 4:
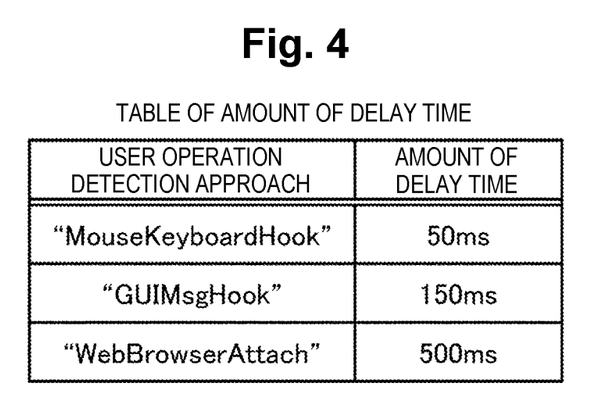
FIG. 4 is a diagram for describing processing of an estimation unit.
Figure 5:
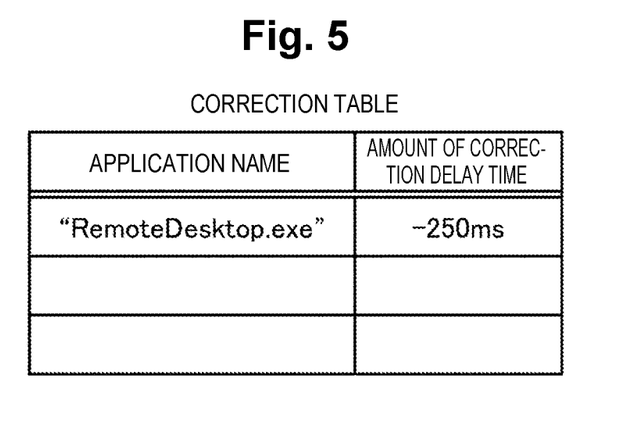
FIG. 5 is a diagram for describing the processing of the estimation unit.
Figure 6:
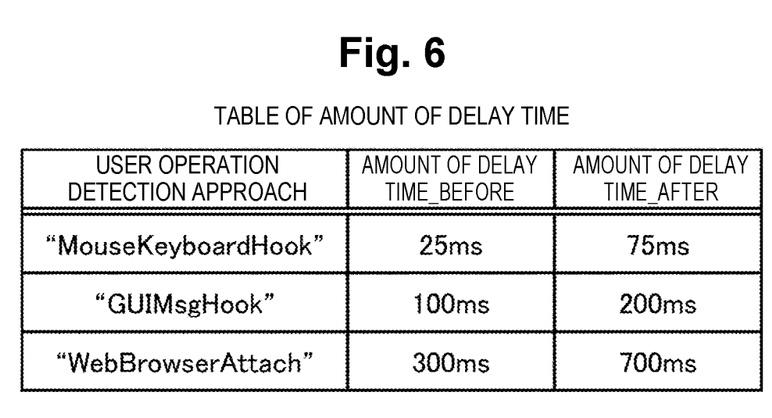
FIG. 6 is a diagram for describing the processing of the estimation unit.

The estimation unit 15c estimates the amount of delay time from the user operation time point to the time point at which the user operation is detected by the detection unit 15b. FIG. 4 to FIG. 6 are diagrams for describing processing of the estimation unit. The method of detecting the user operation has a large impact on the amount of delay time. The estimation unit 15c estimates the amount of delay time in accordance with the method of detecting the user operation.

FIG. 4 is a table showing the amount of delay time for each method of detecting the user operation. In FIG. 4, for example, it is indicated that the amount of delay time from the user operation time point to the detection time point when the method of detecting the user operation is "MouseKeyboardHook" is 50 ms. The user operation recording apparatus 10 stores, for example, the amounts of delay time shown in FIG. 4 in the storage unit 14 in advance.

When information on the application is included in the detection information of which notification is provided from the detection unit 15b, the estimation unit 15c may estimate the amount of delay time in accordance with the application that is the target of the user operation. For example, on a remote desktop, the amount of time from when the operation is performed to when the screen display changes may be long. Thus, in the case of the operation on the remote desktop, the abovementioned amount of delay time is further corrected.

FIG. 5 is a table showing the amount of correction time of the amount of delay time for each application. In FIG. 5, for example, it is shown that the amount of correction time of the application "RemoteDesktop.exe" is −250 ms. When the method of detecting the user operation is "MouseKeyboardHook" and the user operation of the application "RemoteDesktop.exe" is detected, the estimation unit 15c estimates that the amount of delay time is 50 ms-250 ms=−200 ms. Note that "-" expresses the future and means that the user operation time point is 200 ms later than the detection time point.

The estimation unit 15c may estimate a range of the amount of delay time instead of the amount of delay time. FIG. 6 shows the range of the amount of delay time for each detection method. In FIG. 6, for example, it is indicated that the amount of delay time from the operation time point to the detection time point when the method of detecting the user operation is
"MouseKeyboardHook" is from 25 ms to 75 ms. In this case, the user operation time acquired by calculating back from the detection time is also calculated in a range, and hence the selection unit 15d described below estimates the most appropriate image out of the image data corresponding to the time range. For example, the selection unit 15d estimates that the image data closest to the central time in the time range is optimal.

The description returns to FIG. 3. The selection unit 15d selects the image data at the user operation time point calculated from the estimated amount of delay time out of the acquired image data 14a. Specifically, the estimation unit 15c calculates back the user operation time from the amount of delay time, and the selection unit 15d selects the latest image data out of the image data 14a at the calculated user operation time and therebefore as the image of the operation time point.

Figure 7:
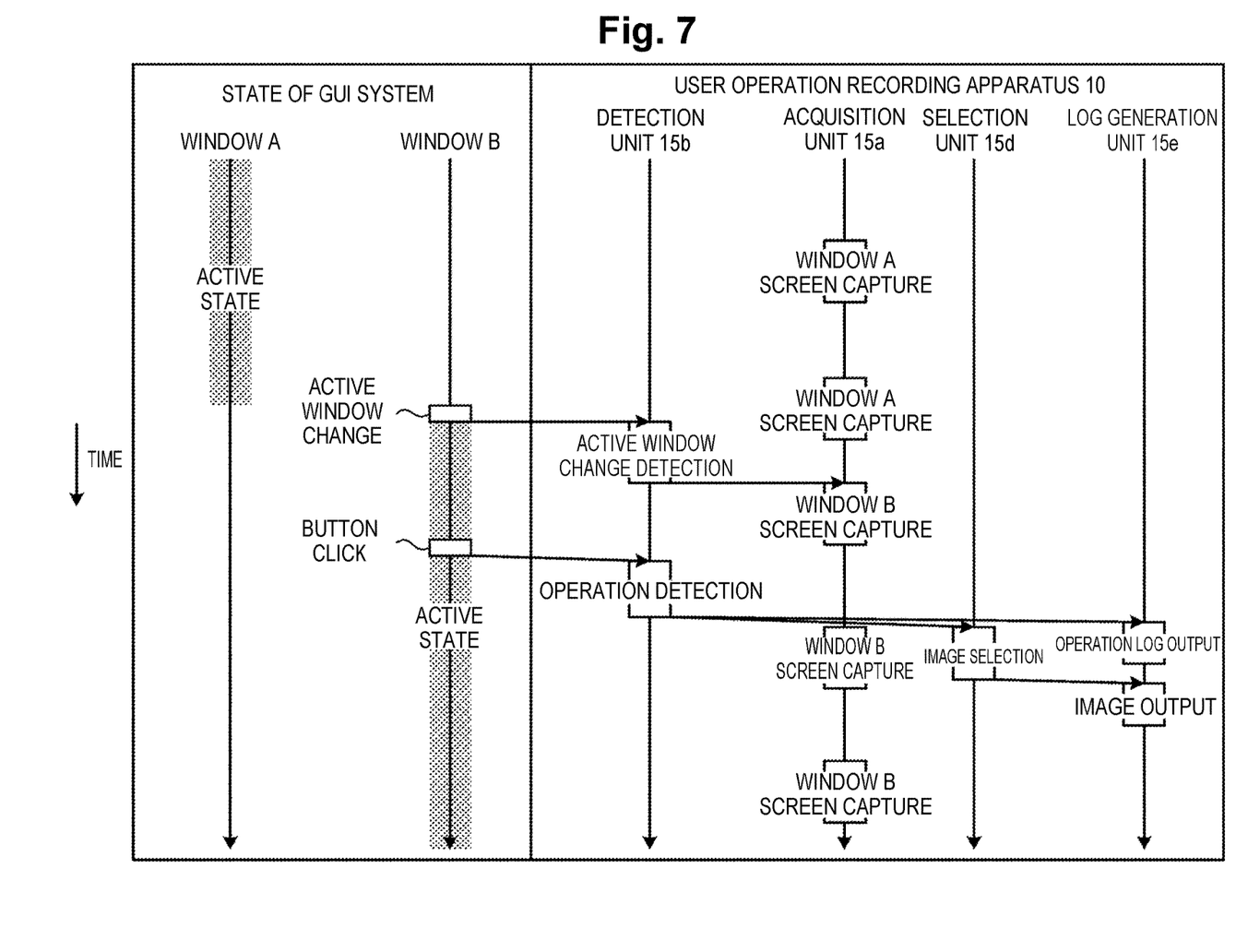
FIG. 7 is a diagram for describing processing of a selection unit.
Figure 8:
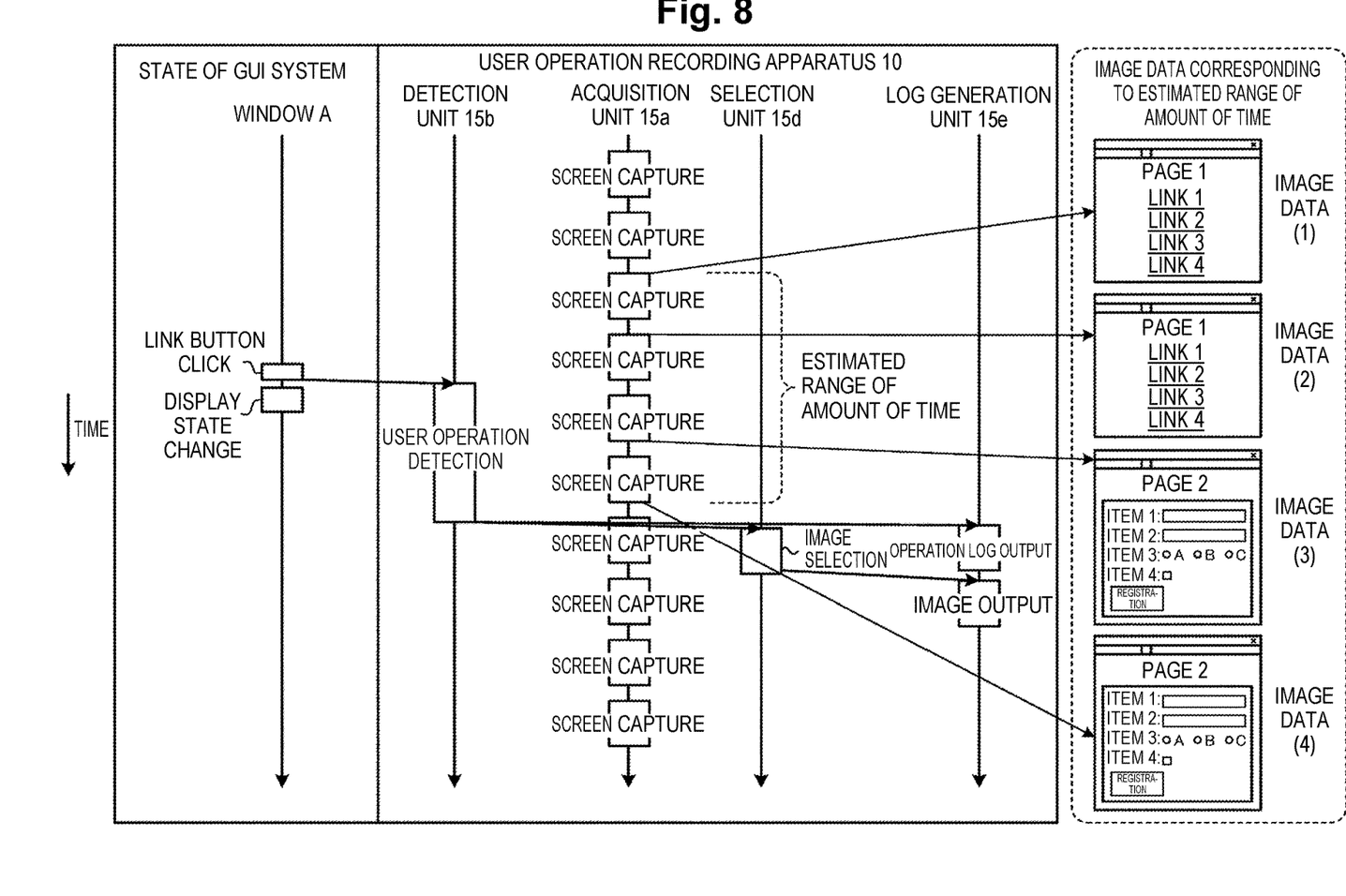
FIG. 8 is a diagram for describing the processing of the selection unit.

FIG. 7 and FIG. 8 are diagrams for describing processing of the selection unit 15d. As described above, the acquisition unit 15a may acquire the image data 14a in units of windows. At this time, there is normally one foreground window (active window) that is the target of operation at a certain time point, and hence the acquisition unit 15a may set the target to be only the active window when the interval of the acquisition is sufficiently short.

Meanwhile, when the interval of the acquisition of the image data 14a is long, a case where the image data 14a of a new active window is not acquired at the operation detection time point may occur in a situation in which an operation on the new active window is performed immediately after the switching of the active window.

Thus, the acquisition unit 15a performs the screen capture of the window displayed on the screen regardless of activation/inactivation. In this case, the acquisition unit 15a does not necessarily need to set the target to be all of the windows displayed on the screen and may narrow down the target on which the screen capture is performed by determining the display state of the windows such as the overlapping order of the plurality of windows, the rate of the portion that is hidden by the overlap, and the like.

Alternatively, the detection unit 15b may detect the change of the active window and instruct the acquisition unit 15a to perform the image capture when the change of the active window is detected. As a result, when the active window changes, the acquisition unit 15a can immediately acquire the image data 14a of the new active window and cause the storage unit 14 to store the image data 14a therein.

In the example illustrated in FIG. 7, a case where the active window switches from a window A to a window B by the user operation is exemplified. In this case, when the interval of the screen capture in units of windows of the acquisition unit 15a is long, a case where the image data of the window B cannot be acquired occurs. Thus, when the detection unit 15b detects the change of the active window, the detection unit 15b provides a notification on information thereof to the acquisition unit 15a, and the acquisition unit 15a acquires the image data of the window B.

In this case, each image data is stored in the storage unit 14 in association with the acquired time and the window ID of which notification is provided by the detection unit 15b.

When the estimation unit 15c estimates the range of the amount of delay time instead of the amount of delay time (see FIG. 6), the selection unit 15d selects image data immediately before the change of the display state out of the image data in the range of the user operation time corresponding to the range of the amount of delay time. Specifically, the selection unit 15d selects the image data immediately before the change when the rate of the change of the display state is equal to or more than a predetermined threshold value.

In the example illustrated in FIG. 8, a case where the display state of the screen transitions by the user operation is illustrated. In this case, out of image data (1) to (4) corresponding to the range of the user operation time that is estimated, the image data (2) of the screen immediately before the transition of the display state is appropriate as the image of the user operation time point while the image data close to the central time in the range is the image data (3).

The selection unit 15d adds up, for example, for the image data (1) to (4), the number of pixels that has changed between images adjacent to each other in chronological order, determines that the image has largely changed when the number of pixels that has changed or the rate of the pixels that have changed to all of the pixels is equal to or more than a predetermined threshold value, and selects the image immediately before the change.

The description returns to FIG. 3. The log generation unit 15e outputs the selected image data and the operation log in association with each other. For example, the log generation unit 15e outputs a text file in which each of the detected operation corresponds to each row to the storage unit 14 as a log. In addition, the log generation unit 15e outputs each image data corresponding to each of the detected operation to the storage unit 14 as each image file by adding identification information to the file name and the like such that the correspondence relationship between each row of the text file and each image file can be understood. Alternatively, the operation log and the image data may be output as single binary data. The log generation unit 15e may perform transmission to another server and the like via the communication control unit 13 instead of performing storage into the storage unit 14.

[User Operation Recording Processing]

Figure 9:
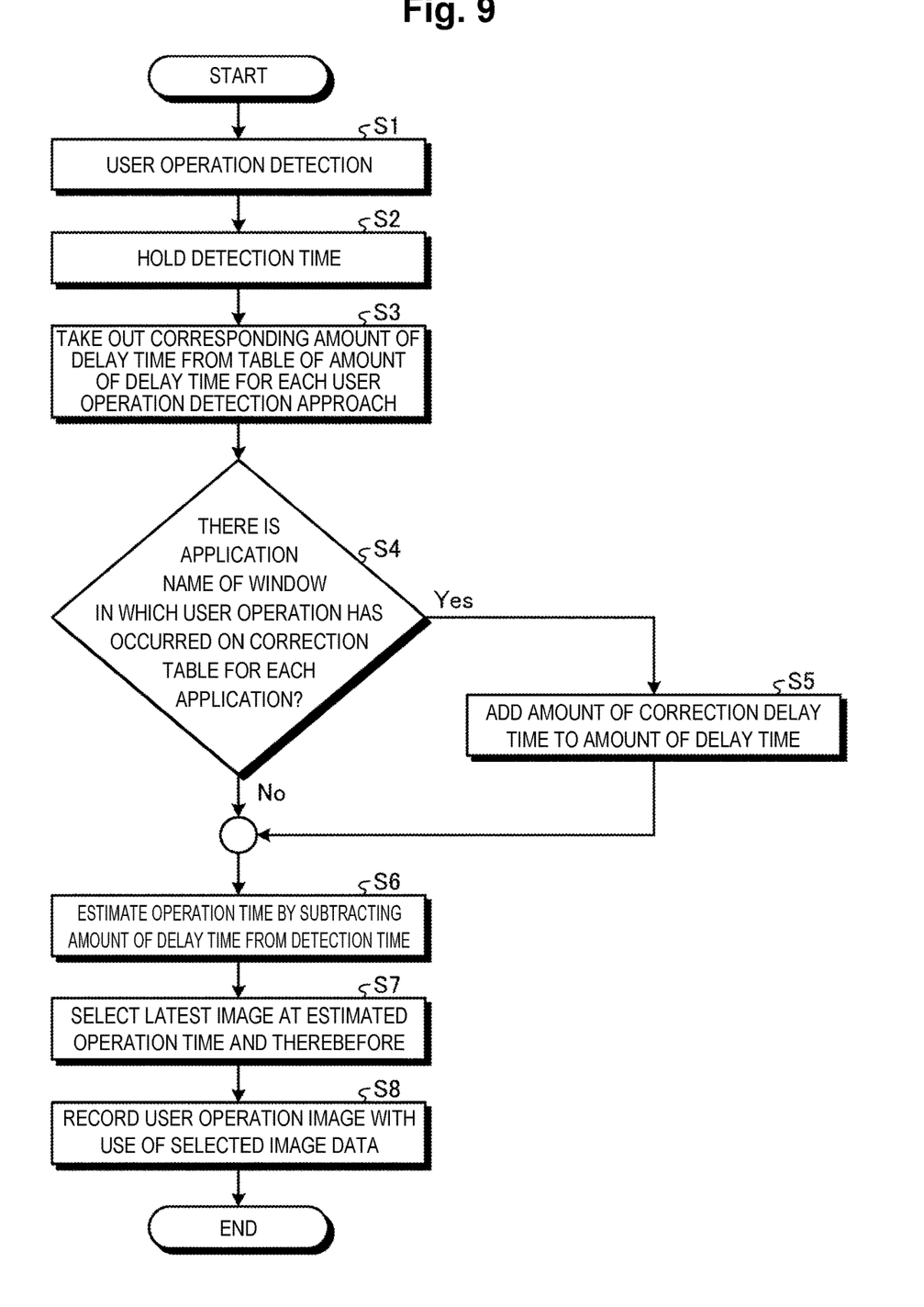
FIG. 9 is a flowchart illustrating a user operation recording processing procedure.
Figure 10:
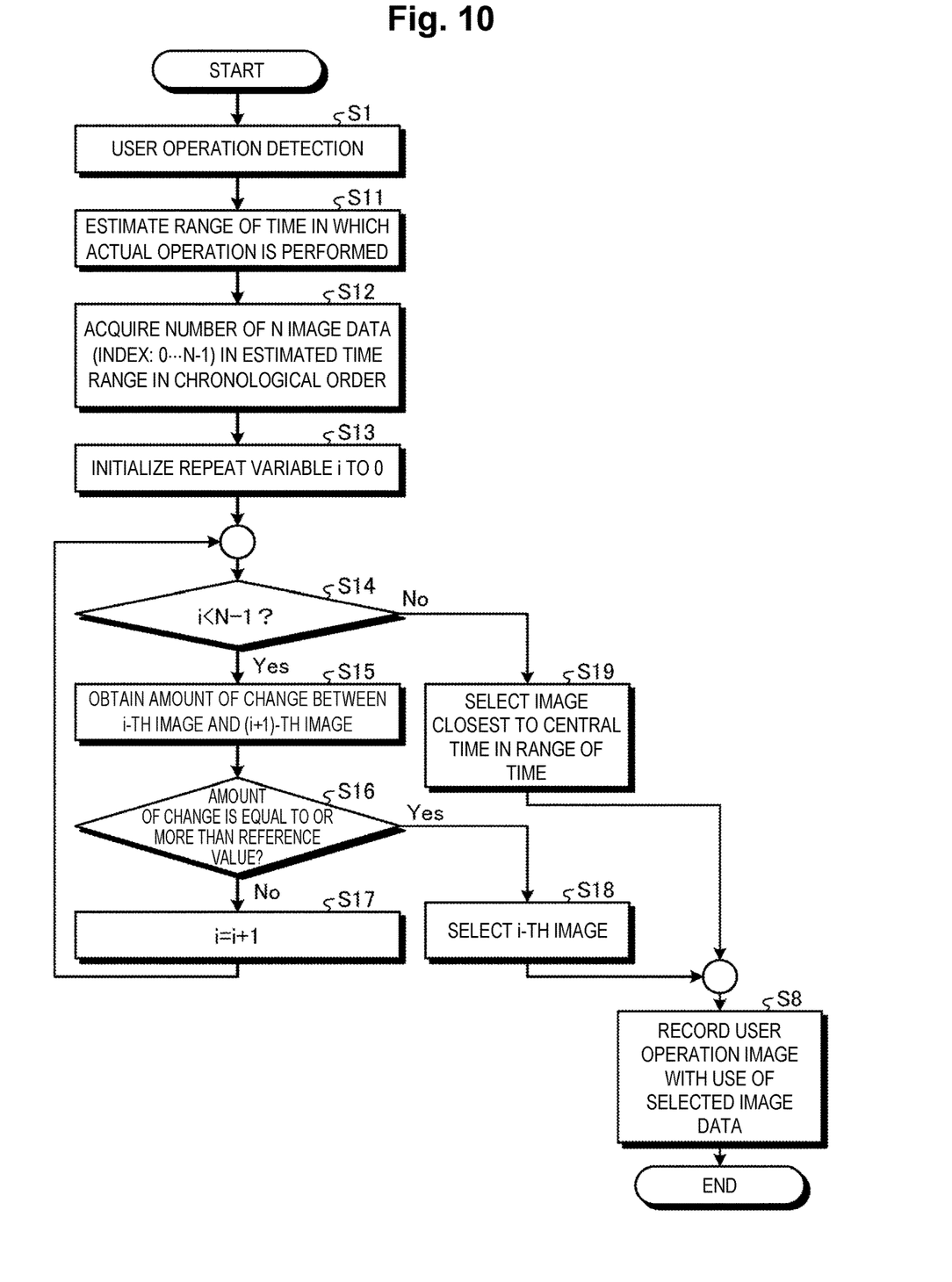
FIG. 10 is a flowchart illustrating the user operation recording processing procedure.

Next, with reference to FIG. 9 and FIG. 10, the user operation recording processing by the user operation recording apparatus 10 according to the present embodiment is described. FIG. 9 is a flowchart illustrating a user operation recording processing procedure. The flowchart of FIG. 9 is started, for example, at a timing at which the user gives an instruction for starting the present apparatus and is repeatedly executed.

First, the acquisition unit 15a acquires the image data 14a by performing the screen capture of the screen in which the operation of the user is reflected at a predetermined interval and causes the storage unit 14 to store the image data 14a therein. When the detection unit 15b detects the user operation (Step S1), the detection unit 15b holds the time of the detection time point (Step S2).

In this case, the estimation unit 15c estimates the amount of delay time of the detection time point from the user operation time point. For example, the estimation unit 15c refers to a table showing the amount of delay time for each user operation detection approach and takes out the amount of delay time of the corresponding detection approach (Step S3). The estimation unit 15c refers to a table showing the amount of correction time of the amount of delay time for each application (Step S4). When there is an application that is the target of the user operation on the table (Step S4, Yes), the estimation unit 15c corrects the amount of delay time acquired in Step S3 by the corresponding amount of correction time (Step S5). Meanwhile, when there are no applications that are the target of the user operation on the table (Step S4, No), the processing proceeds to Step S6. In processing of Step S6, the estimation unit 15c estimates the time of the user operation time point by calculating back from the time of the detection time point and the estimated amount of delay time.

Next, the selection unit 15d selects the latest image data at the estimated time of the user operation time point and therebefore out of the acquired image data 14a (Step S7).

The log generation unit 15e records the user operation image with use of selected image data and the detected operation information (Step S8). As a result, the series of the user operation recording processing ends.

Next, in FIG. 10, a user operation recording processing procedure when the range of the user operation time point is estimated is illustrated. As with the flowchart of FIG. 9, a flowchart of FIG. 10 is started, for example, at a timing at which the user gives an instruction for starting the present apparatus and is repeatedly executed.

First, as with the flowchart of FIG. 9, the acquisition unit 15a acquires the image data by performing the screen capture of the screen operated by the user, at a predetermined interval and causes the storage unit 14 to store the image data therein. When the detection unit 15b detects the user operation (Step S1), the estimation unit 15c estimates the range of the amount of delay time of the detection time point from the user operation time point. For example, the estimation unit 15c refers to a table showing the range of the amount of delay time for each user operation detection approach and takes out the range of the amount of delay time of the corresponding detection approach. The estimation unit 15c estimates the range of the time of the user operation time point by calculating back from the time of the detection time point and the range of the estimated amount of delay time (Step S11).

The selection unit 15d acquires, out of the acquired image data 14a, the image data corresponding to the estimated range of the time of the user operation time point in chronological order from the old image data (Step S12). The selection unit 15d first performs initialization by setting i=0 (Step S13). When i<N−1 is satisfied for the i-th (i=0, ... , N−1) image data, that is, when the i-th image data is not the latest image data (Step S14, Yes), the selection unit 15d obtains the amount of change between the i-th image data and the next (i+1)-th image data (Step S15). For example, the selection unit 15d adds up the number of pixels that has changed between the two image data and calculates the rate to all of the pixels.

When the amount of change is less than a predetermined threshold value, the selection unit 15d (Step S16, No) adds 1 to i (Step S17) and returns the processing to Step S14. Meanwhile, when the amount of change is equal to or more than the predetermined threshold value (Step S16, Yes), the selection unit 15d selects the i-th image data as the image data immediately before a large change of the image to the predetermined threshold value or more (Step S18).

When the selection unit 15d selects the last data in the range of the time of the user operation time point while the amount of change does not become equal to or more than the predetermined threshold value (Step S14, No), the selection unit 15d selects the image data of which acquired time is the closest to the central time in the estimated range of the time (Step S19).

The log generation unit 15e records the user operation image with use of selected image data and the detected operation information (Step S8). As a result, the series of the user operation recording processing ends.

As described above, in the user operation recording apparatus 10 of the present embodiment, the acquisition unit 15a acquires the image data 14a by performing screen capture of the screen operated by the user, at a predetermined interval. The detection unit 15b detects the user operation. The estimation unit 15c estimates the amount of delay time from the user operation time point to the time point at which the user operation is detected by the detection unit 15b. The selection unit 15d selects the image data at the user operation time point calculated from the estimated amount of delay time out of the acquired image data 14a. As a result, the user operation recording apparatus 10 can appropriately acquire the screen capture at the time of user operation.

The estimation unit 15c estimates the amount of delay in accordance with the method of detecting the user operation. The estimation unit 15c estimates the amount of delay time further in accordance with the application that is the target of the user operation. As a result, the time of the user operation time point can be estimated with high accuracy.

The acquisition unit 15a acquires the image data 14a in units of windows. As a result, in the GUI system having the structure of the window, the image at the time of user operation can be acquired with reduction of the data volume in a manner focusing on the part to be noticed for easy recognition.

The detection unit 15b further detects the change of the active window and instructs the acquisition unit 15a to perform image capture when there is the change. As a result, the image of the window at the time of the user operation can be acquired without any leak.

The estimation unit 15c estimates the range of the amount of delay time instead of the amount of delay time. In this case, the selection unit 15d selects image data immediately before the change of the display state out of the image data of the range of the user operation time point corresponding to the range of the amount of delay time. Specifically, the selection unit 15d selects the image data immediately before the change when the rate of the change of the display state is equal to or more than a predetermined threshold value. As a result, the appropriate image at the time of the user operation can be acquired with high accuracy.

[Program]

A program described in a language with which a computer can execute processing executed by the user operation recording apparatus 10 according to the abovementioned embodiment can also be generated. As one embodiment, the user operation recording apparatus 10 can be implemented by causing a desired computer to install thereon a user operation recording program for executing the abovementioned user operation recording processing as package software or online software. For example, by causing an information processing apparatus to execute the abovementioned user operation recording program, the information processing apparatus can be caused to function as the user operation recording apparatus 10. The information processing apparatus herein includes a desktop-type or a laptop-type personal computer. Other than the above, mobile communication terminals such as a smartphone, a mobile phone, and a personal handy phone system (PHS), and slate terminals such as a personal digital assistant (PDA) are included in the category of the information processing apparatus. The function of the user operation recording apparatus 10 may be implemented on a cloud server.

Figure 11:
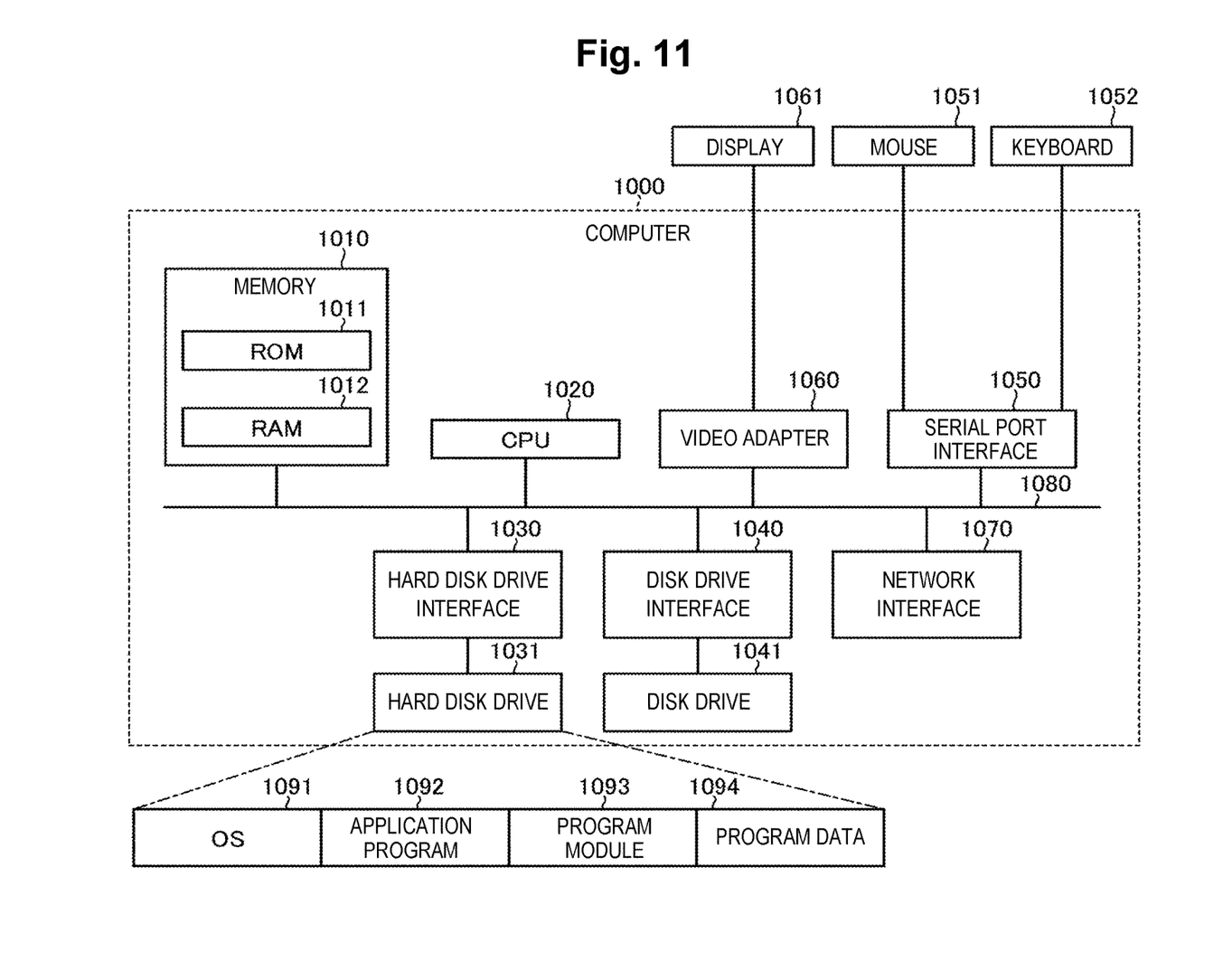
FIG. 11 is a diagram illustrating one example of a computer that executes a user operation recording program.

FIG. 11 is a diagram illustrating one example of a computer that executes the user operation recording program. A computer 1000 includes, for example, a memory 1010, a CPU 1020, a hard disk drive interface 1030, a disk drive interface 1040, a serial port interface 1050, a video adapter 1060, and a network interface 1070. Each of those units is connected by a bus 1080.

The memory 1010 includes a read only memory (ROM) 1011 and a RAM 1012. The ROM 1011 stores therein a boot program such as a basic input output system (BIOS), for example. The hard disk drive interface 1030 is connected to a hard disk drive 1031. The disk drive interface 1040 is connected to a disk drive 1041. For example, a mountable and removable storage medium such as a magnetic disk and an optical disk is inserted into the disk drive 1041. For example, a mouse 1051 and a keyboard 1052 are connected to the serial port interface 1050. For example, a display 1061 is connected to the video adapter 1060.

The hard disk drive 1031 stores therein an OS 1091, an application program 1092, a program module 1093, and program data 1094, for example. Each information described in the abovementioned embodiment is stored in the hard disk drive 1031 and the memory 1010, for example.

The user operation recording program is stored in the hard disk drive 1031 as the program module 1093 in which instructions to be executed by the computer 1000 is described, for example. Specifically, the program module 1093 in which each processing to be executed by the user operation recording apparatus 10 described in the abovementioned embodiment is described is stored in the hard disk drive 1031.

The data used in the information processing by the user operation recording program is stored in the hard disk drive 1031, for example, as the program data 1094. The CPU 1020 reads out the program module 1093 and the program data 1094 stored in the hard disk drive 1031 to the RAM 1012 as needed and executes each of the abovementioned procedures.

The program module 1093 and the program data 1094 according to the user operation recording program are not limited to being stored in the hard disk drive 1031 and may be stored in a mountable and removable storage medium and read out by the CPU 1020 via the disk drive 1041 and the like, for example. Alternatively, the program module 1093 and the program data 1094 according to the user operation recording program may be stored in another computer connected over a network such as a LAN and a wide area network (WAN) and may be read out by the CPU 1020 over the network interface 1070.

The embodiment to which the invention made by an inventor of the present invention is applied has been described above, but the present invention is not limited by the description and the drawings forming a part of the disclosure of the present invention by the present embodiment. In other words, other embodiments, examples, operation technologies, and the like made by a person skilled in the art and the like on the basis of the present embodiment are all included in the scope of the present invention.

REFERENCE SIGNS LIST

10 User operation recording apparatus
11 Input unit
12 Output unit
13 Communication control unit
14 Storage unit
14a Image data
15 Control unit
15a Acquisition unit
15b Detection unit
15c Estimation unit
15d Selection unit
15e Log generation unit

The invention claimed is:

1. A user operation recording apparatus, comprising a processor configured to perform operations comprising:
acquiring image data by performing screen capture of a screen operated by a user, at a predetermined interval set in advance of the screen capture;
detecting the user operation;
estimating an amount of delay time from a user operation time point to a time point at which the user operation is detected by the detection unit;
selecting image data of the user operation time point calculated from the estimated amount of delay time out of the acquired image data;
estimating a range of the amount of delay time independent of the amount of delay time; and
selecting image data immediately before a change of a display state out of the image data in a range of the user operation time point corresponding to the range of the amount of delay time.

2. The user operation recording apparatus according to claim 1, wherein estimating the amount of delay time comprises estimating the amount of delay time in accordance with a method of detecting the user operation.

3. The user operation recording apparatus according to claim 2, wherein estimating the amount of delay time comprises estimating the amount of delay time further in accordance with an application that is a target of the user operation.

4. The user operation recording apparatus according to claim 1, wherein acquiring the image data comprises acquiring the image data in units of windows.

5. The user operation recording apparatus according to claim 4, wherein the processor is configured to perform operations further comprising detecting a change of an active window and instructing the acquisition unit to perform image capture when there is the change.

6. The user operation recording apparatus according to claim 1, wherein selecting the image data comprises selecting the image data immediately before the change when a rate of the change of the display state is equal to or more than a predetermined threshold value.

7. A user operation recording method executed by a user operation recording apparatus, the user operation recording method comprising:

acquiring image data by performing screen capture of a screen operated by a user, at a predetermined interval set in advance of the screen capture;

detecting the user operation;

estimating an amount of delay time from a user operation time point to a time point at which the user operation is detected in the detection step;

selecting image data of the user operation time point calculated from the estimated amount of delay time out of the acquired image data;

estimating a range of the amount of delay time independent of the amount of delay time; and selecting image data immediately before a change of a display state out of the image data in a range of the user operation time point corresponding to the range of the amount of delay time.

\* \* \* \* \*